US011629961B2

(12) United States Patent
Kumar et al.

(10) Patent No.: US 11,629,961 B2
(45) Date of Patent: Apr. 18, 2023

(54) CROSSWALK DETECTION

(71) Applicant: GM CRUISE HOLDINGS LLC, San Francisco, CA (US)

(72) Inventors: Harman Kumar, San Francisco, CA (US); Juan Fasola, San Francisco, CA (US); Yu-Cheng Lin, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 689 days.

(21) Appl. No.: 16/589,020

(22) Filed: Sep. 30, 2019

(65) Prior Publication Data

US 2021/0097308 A1 Apr. 1, 2021

(51) Int. Cl.
| | |
|---|---|
| G06V 20/56 | (2022.01) |
| G01C 21/30 | (2006.01) |
| G01C 21/36 | (2006.01) |
| G01S 17/89 | (2020.01) |
| G01T 5/02 | (2006.01) |
| G08G 1/16 | (2006.01) |
| G06V 10/44 | (2022.01) |

(52) U.S. Cl.
CPC ........... *G01C 21/30* (2013.01); *G01C 21/367* (2013.01); *G01S 17/89* (2013.01); *G01T 5/02* (2013.01); *G06V 10/44* (2022.01); *G06V 20/588* (2022.01); *G08G 1/166* (2013.01)

(58) Field of Classification Search
CPC .... G06V 20/588; G06V 10/44; G01C 21/367; G01C 21/30; G01S 17/89; G01T 5/02; G08G 1/166
See application file for complete search history.

(56) References Cited

U.S. PATENT DOCUMENTS

2019/0266418 A1 8/2019 Xu et al.
2019/0286921 A1* 9/2019 Liang ................... G06F 16/587

OTHER PUBLICATIONS

Berriel R.F., et al., "Ego-Lane Analysis System (ELAS): Dataset and Algorithms," Image and Vision Computing, vol. 68, Dec. 2017, pp. 1-13.
Hata A., et al., "Road Marking Detection Using LIDAR Reflective Intensity Data and its Application to Vehicle Localization," 17th International IEEE Conference on Intelligent Transportation Systems (ITSC), Oct. 8-11, 2014, pp. 584-589.
International Search Report and Written Opinion for International Application No. PCT/US2019/068339, dated Jul. 7, 2020, 11 pages.
Lindner P., et al., "Multi-Channel Lidar Processing for Lane Detection and Estimation," 12th International IEEE Conference on Intelligent Transportation Systems, Piscataway, NJ, USA, Oct. 3-7, 2009, pp. 202-207.

* cited by examiner

*Primary Examiner* — Yuen Wong
(74) *Attorney, Agent, or Firm* — Polsinelli PC

(57) ABSTRACT

Systems and methods are disclosed for detecting crosswalk locations. Crosswalk locations can be detected by determining at least two painted lines on a road surface, and then combining the at least two painted lines on the road surface into a grouping of related elements. The grouping of related elements can be classified into a crosswalk (or in some embodiments a type of crosswalk) based on attributes of the grouping of related elements, where the attributes of the grouping of the elements includes a distance between the at least two painted lines, and an orientation of the grouping of related elements on the road surface.

20 Claims, 7 Drawing Sheets

CROSSWALK DETECTION

TECHNICAL FIELD

The present technology pertains to updating a portion of a map database using data captured by an autonomous vehicle, and more specifically pertains to updating crosswalk locations in portions of a map database having high-resolution data using data obtained from an autonomous vehicle.

BACKGROUND

An autonomous vehicle is a motorized vehicle that can navigate without a human driver. An exemplary autonomous vehicle includes a plurality of sensor systems, such as, but not limited to, a camera sensor system, a LIDAR sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

The autonomous vehicle navigates using a combination of data captured by at least one sensor of the autonomous vehicle and a map stored on the autonomous vehicle. The map is commonly created using a special purpose mapping vehicle which captures data at a much higher resolution than the at least one sensor on the autonomous vehicle. However, in some locations the map may be incomplete, lacking, or the location of crosswalks can change due to construction, lane changes, or other factors. When this happens the autonomous vehicle can run into issues navigating based on incomplete or outdated maps, and the road portions where the inconsistencies exist become restricted areas for the autonomous vehicle until the map is updated.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
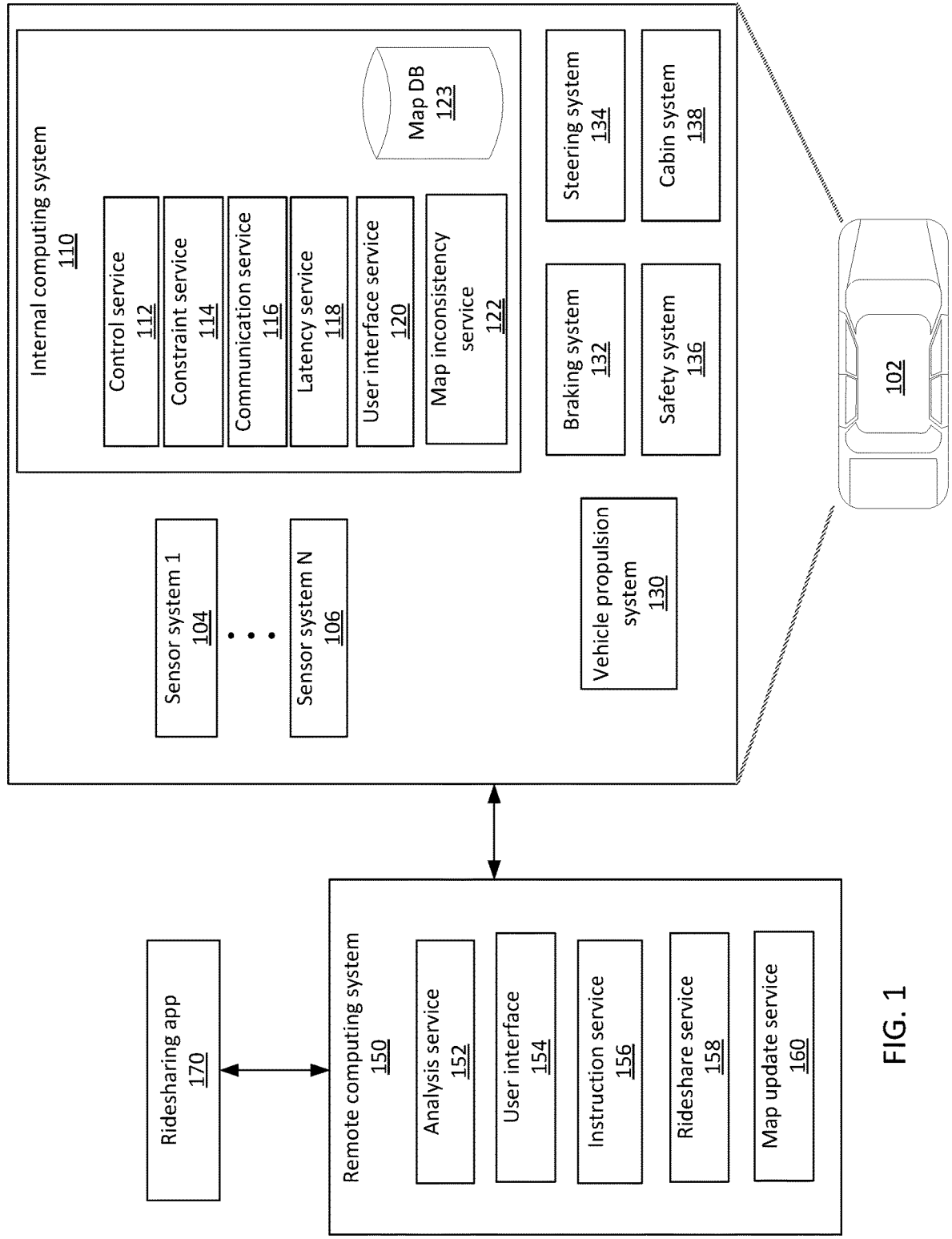
FIG. 1 shows an example system for piloting and management of an autonomous vehicle in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a technology that can quickly update a map used for routing an autonomous vehicle that reflects changing crosswalk locations without the need for a special purpose mapping vehicle or manual intervention.

The autonomous vehicle navigates using a combination of data captured by at least one sensor of the autonomous vehicle and a map stored on the autonomous vehicle. The map is commonly created using a special purpose mapping vehicle which captures data at a much higher resolution than the at least one sensor on the autonomous vehicle. In this way, the map that informs autonomous vehicle navigation is generated before navigation, so that routes to specific destinations can be determined as soon as a destination is received. However, crosswalk locations can appear or change since the special purpose mapping vehicle mapped the route. For example, if crosswalk on the route has been painted since the last time the special purpose mapping vehicle mapped the route, and the autonomous vehicle relies on the map's semantic boundaries indicating crosswalks to drive, then the autonomous vehicle would not behave correctly on the road since the traffic markings have been modified. Since updating the high-resolution map requires the special purpose mapping vehicle, a significant period of time can pass before the high-resolution map is updated.

The disclosed technology solves the above issues by enabling various embodiments to find areas where the crosswalk locations have changed with respect to the map. The scope of the change can trigger various responses, such as determining which portions of the map can be trusted (e.g., use the already stored semantic boundaries in certain portions) vs needs updating (e.g., don't use the already stored semantic boundaries), detecting crosswalks on a live basis and redrawing semantic boundaries based on the detected lines, etc.

The present technology provides a system that can update the semantic labels of the map stored on the autonomous vehicle on a live basis using data from the sensors of the autonomous vehicle, and therefore avoids the need for dispatching the special purpose mapping vehicle for these updates. This makes planning routes and routing the autonomous vehicle more efficient and significantly reduces the amount of down time before a map update can be issued. The present technology also reduces the work load on the special purpose mapping vehicle because it is dispatched less often, and therefore, even when the map needs data from the special purpose mapping vehicle for an update, the time taken to update the map is shortened due to a reduction in the number of jobs queued for the special purpose mapping vehicle. Therefore, whether the special purpose mapping vehicle is needed or not, semantic label updates can be issued more quickly, and the periods in which areas are restricted to autonomous vehicles due to outdated maps are shortened.

In the following systems and methods, crosswalk locations can be detected by determining at least two painted lines on a road surface, and then combining the at least two painted lines on the road surface into a grouping of related elements. The grouping of related elements can be classified into a crosswalk (or in some embodiments a type of crosswalk) based on attributes of the grouping of related elements, where the attributes of the grouping of the elements includes a distance between the at least two painted lines, and an orientation of the grouping of related elements on the road surface.

FIG. 1 illustrates environment 100 that includes an autonomous vehicle 102 in communication with a remote computing system 150.

The autonomous vehicle 102 can navigate about roadways without a human driver using sensor signals output by sensor systems 104-106 of the autonomous vehicle 102 and a map stored in map database 123. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a LIDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, map updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The map inconsistency service 122 can compare data collected by sensors 104-106 to the map stored in map database 123. The map, for example, can be initially created using pre-mapped data. The configuration of crosswalks and roads commonly changes due to repainting, construction, or other factors. When this happens, the map inconsistency service 122 determines that the map stored in map database 123 reflects inconsistencies as compared with current conditions, and the road portions where the inconsistencies exist can be flagged for the autonomous vehicle until the map is updated. The map inconsistency service 122 can communicate with map update service 160 via the communication service 116 to receive updated portions of the map.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, map updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As introduced above, the present technology provides a system that can identify changed aspects of the map, such as current crosswalk locations, stored on the autonomous vehicle's 102 map database 123 using low-resolution data from the at least one sensor 104-106 of the autonomous vehicle 102. In some embodiments, the initial map can include pre-mapped data that includes a high density of points obtained from a high-resolution LIDAR system on a special purpose mapping vehicle, otherwise referred to as a high-resolution point map, and semantic labels that identify features represented in the high density of points obtained from the high-resolution LIDAR system. The semantic labels can identify features such as lane lines, line colors, driveways, locations of stop signs and stoplights, crosswalks, etc. In one or more embodiments, the map can further include low-resolution point map data indicative of updates to the pre-mapped features and semantic labels as described herein.

In some embodiments, the present technology can use low-resolution data from the at least one sensor 104-106 of the autonomous vehicle 102 to detect new features, and an administrator can manually relabel the semantic labels on top of the existing high density of points obtained from the high-resolution LIDAR system already represented in the stored pre-mapped map. In some embodiments, the semantics labels may be relabeled automatically.

Figure 2:
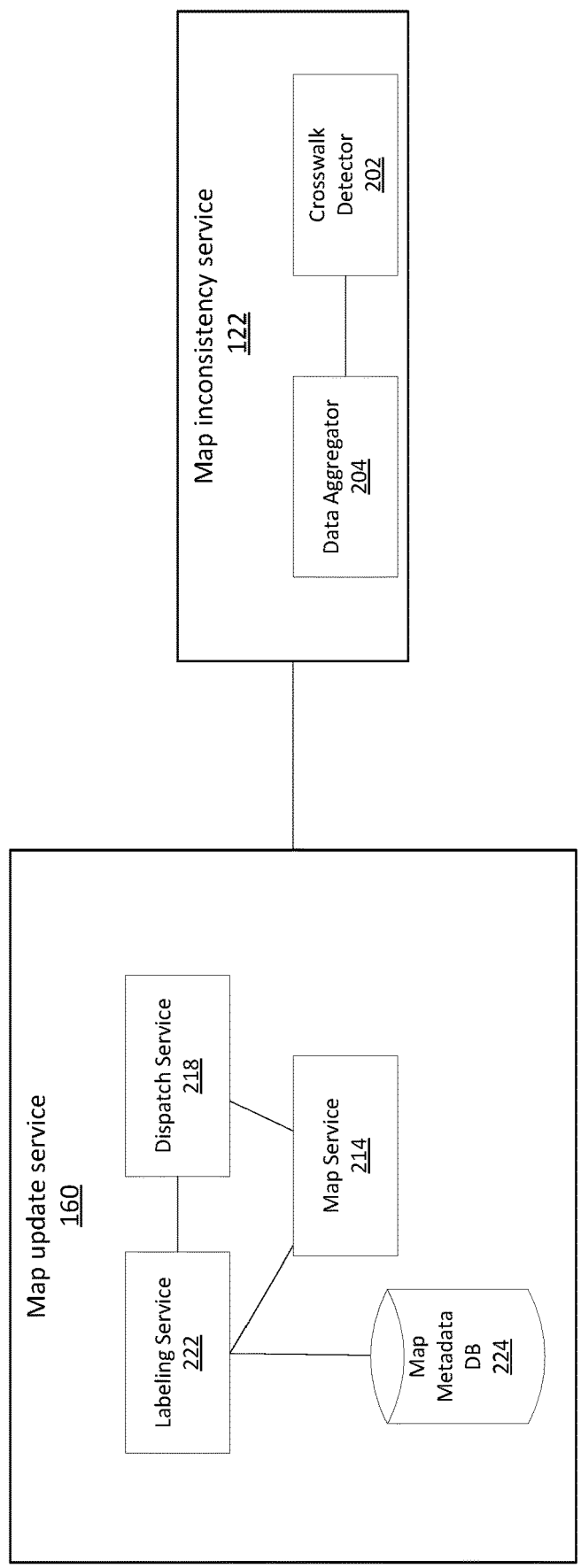
FIG. 2 shows an example system for updating crosswalk portions in the map in accordance with some aspects of the present technology.

FIG. 2 illustrates an example system embodiment showing the map update service 160 and the map inconsistency service 122 in greater detail. While the system illustrated in FIG. 2 is discussed with respect to the method illustrated in FIG. 6, it should be appreciated that each of the figures represents their own separate embodiment and should not be limited by such cross-reference between the figures except as defined in the claims.

The map inconsistency service 122 functions to determine when crosswalk features illustrated in the pre-mapped high definition map stored in map database 123 are inconsistent with crosswalk features in current data detected by sensors 104-106 (such as absent, added, or otherwise modified). While in some embodiments sensors 104-106 may capture data at a lower resolution than is reflected in the high definition map, the current data captured by sensors 104-106 can be sufficient to determine such inconsistencies. Detecting these inconsistencies is important because the high definition map can become outdated and no longer reflect the configuration of the road. The current data from sensors 104-106 reflect the current configuration of crosswalk locations.

As the autonomous vehicle 102 navigates a route, sensors 104-106 capture current data reflecting the environment around the autonomous vehicle 102. The data aggregator 204 can accumulate the current data from the at least one sensor 104-106 as the autonomous vehicle 102 passes through a geographic area, such as geographic areas including a crosswalk. Even over a small distance, data aggregator 204 can accumulate current data from the same sensor as the sensor continuously collects data. For example, in the case of a LIDAR sensor, the LIDAR continuously creates a point map from current data collected from the environment around the autonomous vehicle 102, and this data is aggregated by data aggregator 204.

While current data is being captured by the at least one sensor 104-106 of the autonomous vehicle 102, in some embodiments the crosswalk detector 202 can detect new features represented in the captured current data by clustering the data into feature types (such as crosswalks, or in some embodiments types of crosswalks), and can compare the detected features in the captured current data with features represented in the pre-mapped data, e.g. the map stored in map database 123.

In some instances, the crosswalk detector 202 can determine that the feature in the current data is different than the feature represented in the pre-mapped data. For example the pre-mapped data may reflect a crosswalk at a particular location on a road whereas the current data might reflect the crosswalk at a different location on the road. In some embodiments, the crosswalk detector 202 can determine a type of feature based on characteristics of the current data. For example the feature detector can determine that a crosswalk has changed from a zebra-type crosswalk to a parallel line-type crosswalk. Other examples of inconsistencies might include the addition or removal of a crosswalk, the presence or absence of a crosswalk, a change in orientation of the crosswalk (e.g., tilted 30 degrees closer to the lane), etc.

If the crosswalk detector 202 determines that the pre-mapped data does not include semantic labels that reflect the features as represented in the current data, the crosswalk detector 202 can publish the location and type of inconsistency detected. For example, if the crosswalk detector 202 determines that a crosswalk is present in a location other than where the crosswalk is reflected in the pre-mapped data, then the crosswalk detector 202 can identify the location where the crosswalk has been detected and identify a location change.

In some embodiments, the crosswalk detector 202 can also classify the type of change. For example when the change is with respect to a crosswalk type changing from a zebra type to a parallel line type, the crosswalk detector 202 can label the inconsistency as a crosswalk type added to a new location, removed from an expected location, or changed from how it is currently represented in the map data portion. For crosswalk changes, the crosswalk detector 202 can also include crosswalk color (e.g., white, yellow, etc.). In addition, the crosswalk detector 202 can identify the sensor type that detected the change, such as a LIDAR sensor or a camera.

The data aggregator 204 can mark the accumulated current data from the at least one sensor 104-106 as reflecting a detected change, and the data aggregator 204 can send the accumulated current data reflecting the inconsistency to the map update service 160. For example, the accumulated current data can include a low-resolution point map reflecting the inconsistency. The accumulated current data may also have any other sensor information from the autonomous vehicle 102, such as camera data to determine crosswalk color or bounding boxes, that can assist and be incorporated into an update to the map.

In some embodiments, the pre-mapped data can be stored as a collection of map portions. In such embodiments, the data aggregator 204 may stop sending the accumulated current data reflecting the inconsistency to the map update service 160 when the current data that the data aggregator 204 is receiving no longer applies to that map portion. The data aggregator 204 can continue to collect current data reflecting the inconsistency with respect to a different map portion. In some embodiments, a map portion can be defined by a geographic boundary having location coordinates such as might be reflected on a tile of a physical map.

In some embodiments, the map service 214 can indicate the current data as low-resolution data, which prevents the current data from being included directly into any updates to the pre-mapped data (but in some embodiments, the low-resolution data can be used to make labeling revisions which are included in the pre-mapped data). The map service 214 can manage versions of map portions and access to the map portions. Once a version of a map portion has been brought under management of the map service 214, the map service can store and make the version of the map portion accessible for review, and when appropriate, inclusion in the latest version of the map data for use by the autonomous vehicle 102.

Once the data received has been stored and put under management of map service 214 as a version of a map portion, the labeling service 222 can retrieve the version of the map portion that shows the inconsistency with the pre-mapped data map portion, and review the low-resolution current data against the pre-mapped data map portion to confirm the existence of the inconsistency.

In some embodiments, if the labeling service 222 confirms the inconsistency, the labeling service 222 can cause the relevant map portion of the pre-mapped data to become marked as restricted in the map service 214. When a map portion is marked as restricted by map service 214, this information can be published to the autonomous vehicle 102 and the autonomous vehicle 102 can be prohibited from piloting itself within the area represented on the restricted map portion. The autonomous vehicle 102 would be brought to a gentle stop. In some embodiments, the autonomous vehicle 102 can continue to navigate if the labeling service 222 confirms the inconsistency as long as the scope of the changes would not make driving unsafe. In some embodiments, the autonomous vehicle 102 may be able to dynamically analyze the changes and modify semantic labels on the map and navigate accordingly, and in some embodiments an administrator may be able to navigate the autonomous vehicle 102 through the changed area in real time or near real time.

In some embodiments, the labeling service 222 can further determine whether the inconsistency can be remedied with the low-resolution current data. If the inconsistency is of such a nature that new high-resolution data is required, the dispatch service 218 can schedule a special purpose map vehicle to remap the location represented in the map portion. New high-resolution data can be required when large map portions are inconsistent, details of the inconsistency are not sufficiently clear to relabel the map portion, or for data deemed critical for the piloting of the autonomous vehicle 102. An example of a critical inconsistency that might require new high-resolution data would include extensive repainting in the drivable area related to new intersections, the addition of a new light rail line, etc.

In response to the labeling service 222 determining that the inconsistency can be remedied with the low-resolution current data, the labeling service 222 can analyze the received low-resolution current data and the pre-mapped data to relabel the map data, which yields an updated map data portion. The labeling service 222 can be performed using heuristics to identify patterns that require relabeling, or in some embodiments can utilize machine learning algorithms to perform the relabeling. In some embodiments, all or a portion of the relabeling can be performed manually, and the machine learning algorithms provides a clue for human labelers to revise and update the map. The autonomous vehicle 102 may then in some embodiments be brought to a stop, and in some embodiments be manually piloted remotely on a real-time or near real-time basis.

The labeling service 222 can associate the revised map data portion with the sources of data used to create it, which includes the low-resolution current data from the autonomous vehicle 102 sensor 104-106, and the high-resolution pre-mapped data from the previous version of the map portion which provides the high definition map points addressed above, and stores this information in the map metadata database 224. If new revisions are made to the revised map data portion, the labeling service 222 may save the updated low-resolution current data from the autonomous vehicle 102 sensor 104-106, upon which the new revised map data portion was based, into the map metadata database 224. The low-resolution current data may be versioned and appropriately associated with the corresponding revised map data portion.

Figure 3:
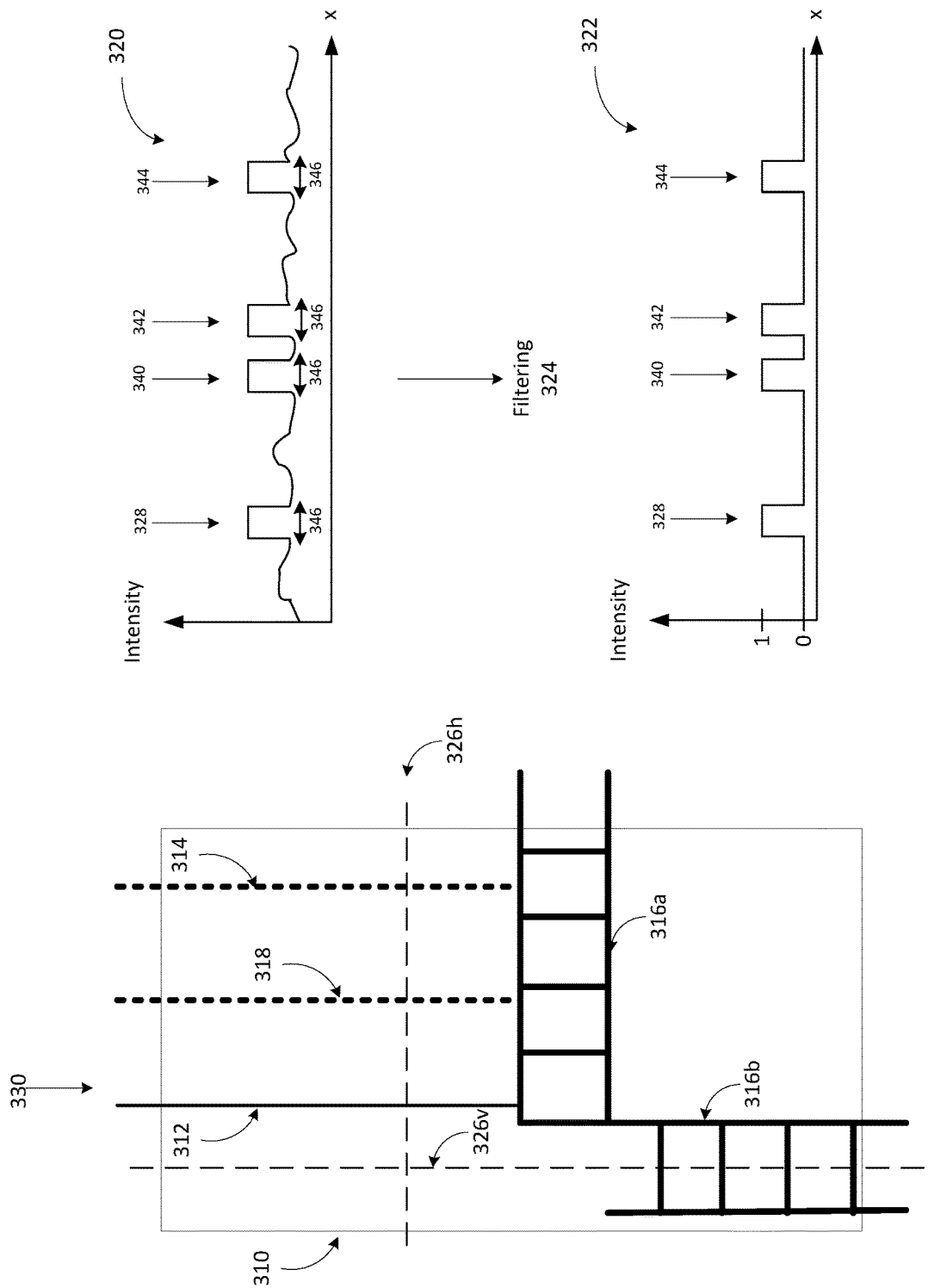
FIG. 3 shows an example visualization of data showing sensor data detecting crosswalks in accordance with some aspects of the present technology.

FIG. 3 shows an example visualization sensor data detecting crosswalk locations in accordance with some aspects of the present technology. Road 310 of graphical representation 330 includes one or more lane boundaries, such as dashed line lane boundaries 318 and 314, and road boundary 312. As an autonomous vehicle navigates a route that includes road 310, the autonomous vehicle can receive current data from one or more sensors that can indicate an inconsistency between pre-mapped data describing a location on a map, and a current data describing a feature of the location. For example, the pre-mapped data included lane boundaries 314, 318, and road boundary 312 from the last pass of a special purpose mapping vehicle, but since that time road 310 has been repainted to include crosswalks 316a, 316b (e.g., crosswalks were added to the corresponding intersection).

In order to detect road 310 and the features on the road, such as crosswalks, lane boundaries, turning lanes, etc., the autonomous vehicle can sense its surrounding environment through at least one sensor mounted to or otherwise disposed upon the autonomous vehicle. For example, the sensor(s) could be part of a sensor system that includes LIDAR sensors and/or camera sensors. Other exemplary sensor systems can include radar sensor systems, global positioning system (GPS) sensor systems, inertial measurement units (IMU), infrared sensor systems, laser sensor systems, sonar sensor systems, and the like. The LIDAR sensors can, for example, detect and/or capture changes in intensity between painted portions of road 310 (e.g., road features such as lane boundaries 314, 318; road boundaries such as 312, and crosswalks such as 316a, 316b) and unpainted portions of road 310. The lighter colored painted portions of road 310 will show up as higher intensity areas than the darker, unpainted portions of road 310.

An intensity map can be built from the sensors detecting changes in intensity on road 310, and can then be compared with features on the pre-mapped map. Graph 320, for example, illustrates intensity as a function of position (x) along a portion of an intensity map for road 310, and graph 322 illustrates intensity as a function of position (x) along a portion of an intensity map for road 310 after filtering 324 into a binary map. In some embodiments, graph 320 represents a horizontal cross section 326h of road 310, which shows peak 328, peak 340, peak 342, and peak 344 of higher intensities corresponding to parallel line patterns of crosswalk 316a. The lower intensity areas correspond to the unpainted portions of road 310. In some embodiments, graph 320 can represent a vertical cross section 326v of road 310, which would similarly shows peaks of higher intensities corresponding to parallel line patterns of crosswalk 316b. In some embodiments, both the horizontal cross section 326h and vertical cross section 326v of road 310 can be combined to form a 2-D intensity map with both sets of information.

In some embodiments, a noisy signal from the sensors can be cleaned up. In some embodiments, for example, intensity measurements from LIDAR can indicate a lane boundary when a peak in intensity spans at least a threshold distance 346 but no larger than a maximum threshold distance. This is because a crosswalk marking should produce a higher intensity signal for over a specific width between some minimum size and some maximum size. Any peak in intensity that is outside the threshold distance 346 can be filtered out during filtering 324 as noise (since it is likely to indicate lane lines or other features of road 310 that are not crosswalks).

Additionally and/or alternatively, in some embodiments the change in intensity, rather than its width, may be used to filter out noise within the current data. For example, any peak less than a threshold change from the average non-peak intensity can be removed as noise during filtering 324. While the embodiments described by FIG. 3 measure painted vs. non-painted areas of road 310 by changes in intensity, since that removes the need to calibrate sensors to be consistent across all autonomous vehicles, in some alternative embodiments the intensity can be measured to certain values. In this way, peaks at or above a certain intensity value across a threshold distance can be detected features, and other data points can be thrown out as noise during filtering 324.

Filtering 324 removes data that does not indicate a detection of a painted area of the crosswalk (e.g., noise). Once filtering 324 has been performed, the data can be binarized such that painted areas have a certain value (e.g., intensity=1, or a "white" pixel), and non-painted areas have another value (e.g., intensity=0, or a "black" pixel). Graph 322 shows a binary intensity as a function of position for peaks 328, 340, 342, and 344.

Figure 4:
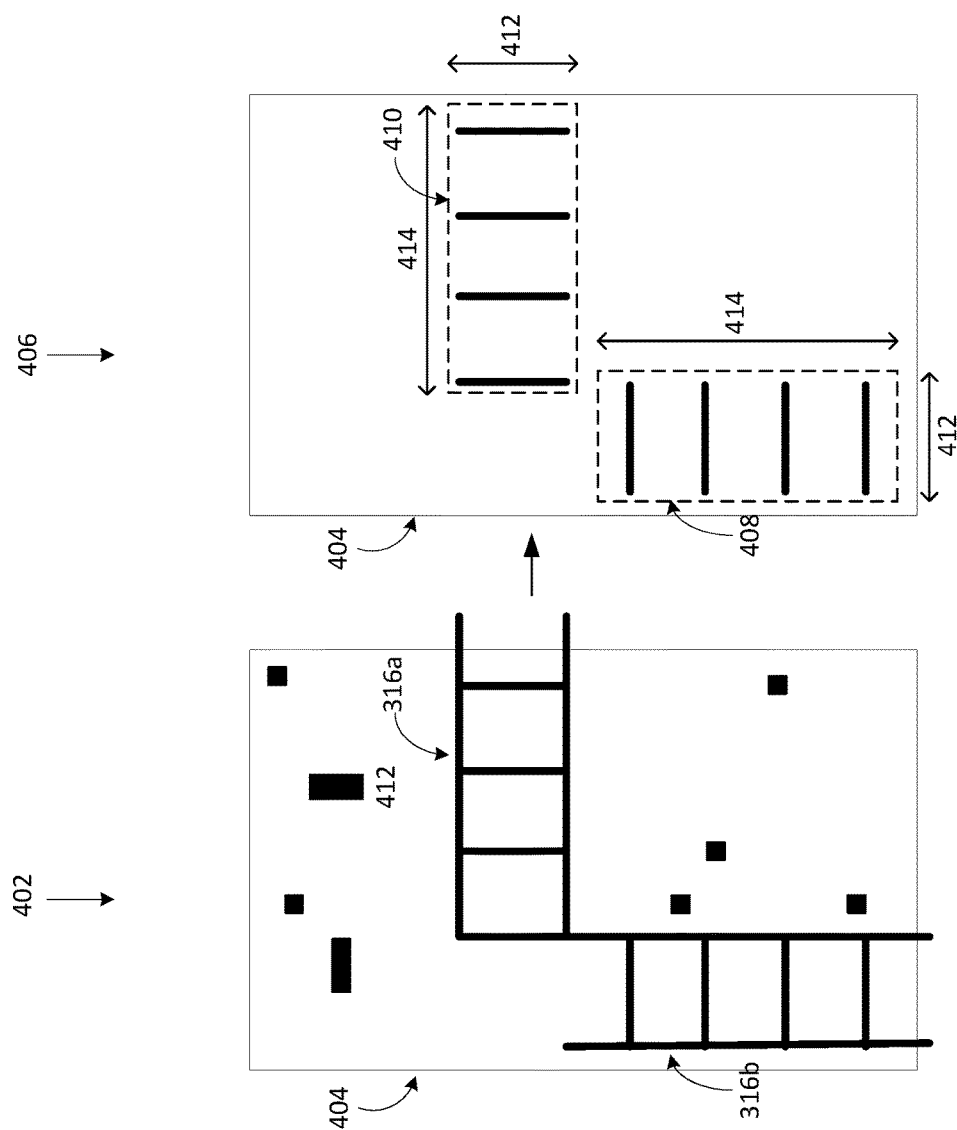
FIG. 4 shows an example visualization of data filtering and crosswalk type classification in accordance with some aspects of the present technology.

FIG. 4 illustrates a graphical representation 402 of the current point cloud of a stretch of road 404. The current data describes, such as was described in FIG. 3, areas where the high intensity areas (e.g., painted lane boundaries) span a spatial closeness narrower than a threshold maximum width and wider than a threshold minimum width, and the high intensity areas being above a threshold intensity of low intensity areas (e.g., bare road). Graphical representation 406 illustrates the current point cloud after data filtering and crosswalk type classification into a zebra-type crosswalk in accordance with some aspects of the present technology. The pixels can be filtered from grayscale LIDAR data into black pixels (e.g., intensity=0 for unpainted areas) or white pixels (e.g., intensity=1 for pained areas) (e.g., a binary map).

The current data can be clustered into one or more features based on a spatial closeness of high intensity areas in a range between a minimum length and a maximum length. For example, after evaluating the white pixels in both a horizontal sweep and a vertical sweep, the pixels can be connected when the pixels are within the specific range. For example, the range can be large enough to distinguish from dashed lane markings, but small enough to distinguish from solid line lane boundaries. Any groups of white pixels having a thickness in pixels within the range of pixels can be combined into a line. Any pixels, such as pixels 412, which do not fall within the clustered pixels are removed during filtering and are accordingly removed in graphical representation 406.

At least two lines (represented painted lines on the road 404 surface) can be combined into a grouping of related elements that indicate features of the road 404. The lines can be clustered into feature 408 and feature 410.

In some embodiments, heuristics can be applied to the clustered lines that generate certain structures and/or shapes of features. For example, the shape and structure of the high intensity area of feature 408 can be indicative of a zebra-type crosswalk, as well as feature 410 (in a different orientation). In some embodiments, the connected lines can be clustered based on a determination that the shape of the feature is not within a same direction as road 404 (which can indicate a bike lane instead of a crosswalk).

In some embodiments, when the lines are combined into a feature (e.g., 408 or 410), a minor axis 412 and a major axis 414 can be determined. The major axis 414 can be the longest diameter of features 408, 410. The minor axis 414 can be the shortest diameter of features 408, 410. In some embodiments, the major axis 414 and the minor axis 414 are orthogonal to each other, and the minor access can be within 20 degrees parallel to the direction of travel.

In some embodiments, the grouping of related elements can be classified based on attributes of the grouping of related elements. The attributes of the grouping of the elements can include a distance between at least two painted lines, and an orientation of the grouping of related elements on the road surface, that indicates a zebra-type crosswalk (close distances) vs. a parallel line-type crosswalk (large distances).

Figure 5:
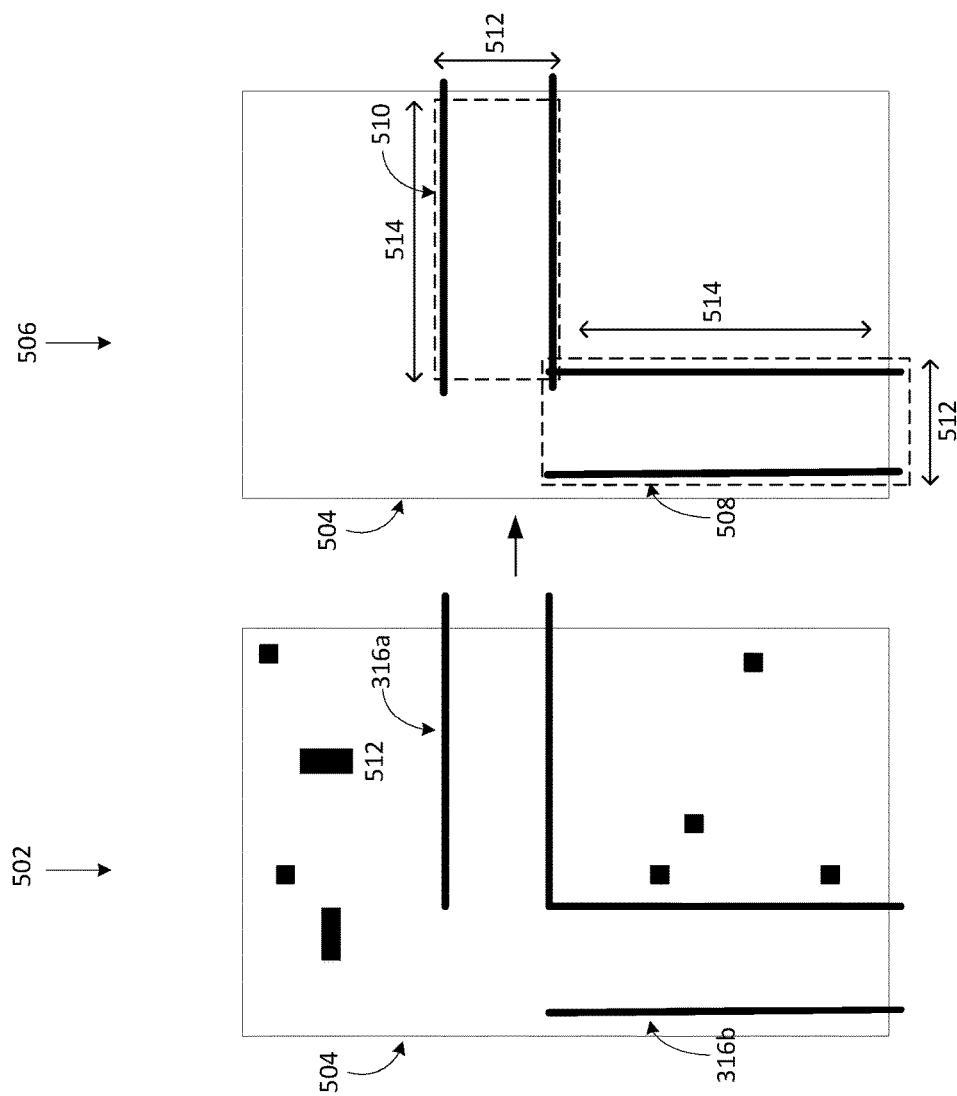
FIG. 5 shows an example visualization of data filtering and crosswalk type classification in accordance with some aspects of the present technology.

FIG. 5 illustrates a graphical representation 502 of the current point cloud of a stretch of road 504. Similar to FIG. 4, the current data describes areas where the high intensity areas (e.g., painted lane boundaries) span a spatial closeness narrower than a threshold maximum width and wider than a threshold minimum width, and the high intensity areas being above a threshold intensity of low intensity areas (e.g., bare road). Graphical representation 506 illustrates the current point cloud after data filtering and crosswalk type classification into a parallel line-type crosswalk in accordance with some aspects of the present technology. The pixels can be filtered from grayscale LIDAR data into black pixels (e.g., intensity=0 for unpainted areas) or white pixels (e.g., intensity=1 for pained areas) (e.g., a binary map).

The current data can be clustered into one or more features based on a spatial closeness of high intensity areas in a range between a minimum length and a maximum length. After evaluating the white pixels in both a horizontal sweep and a vertical sweep, the pixels can be connected when the pixels are within the specific range. Any groups of white pixels having a thickness in pixels within the range of pixels can be combined into a line. Any pixels, such as pixels 512, which do not fall within the clustered pixels are removed during filtering and are accordingly removed in graphical representation 506.

At least two lines (represented painted lines on the road 504 surface) can be combined into a grouping of related elements that indicate features of the road 504. The lines can be clustered into feature 508 and feature 510, each with a major axis 514 and a minor axis 512.

In some embodiments, the crosswalks can be preceded and/or bounded on both sides by a stop line. In some cases, when the stop line precedes a crosswalk (especially parallel-type crosswalks), the autonomous vehicle may have trouble decoupling the stop line from the crosswalk feature, and could attempt to define the crosswalk feature as encompassing the stop line as well. For example, crosswalk features might be defined as starting at the stop line, or a crosswalk feature that depends on a density of lines (like a zebra-type crosswalk), may look like it has a lower density if the stop line is included within the feature. This can result in an inaccurate determination of not only the location of the crosswalk, but can also result in potential false conclusions that there is not a crosswalk there. In other instances, the stop line may be an indicator that a potential crosswalk is located near the stop line's vicinity. As a consequence, stop lines may be flagged as features of interest in the pre-mapped data or, in some embodiments, detected as lines that span a minimum and maximum length on par with the width of a lane. In some embodiments, the LIDAR and/or camera data can detect the painted word "STOP" preceding the stop line.

In the case of stop lines, only stop lines that are within about 20 degrees of angle from a direction orthogonal to the autonomous vehicle's direction of motion are considered. This is because stop lines within this range are road features that the autonomous vehicle will hit head on (e.g., stop lines in other directions of travel or parallel to the autonomous vehicle's direction of travel are inconsequential to the navigation of the autonomous vehicle, and hence are skipped to save compute resources). Once a stop line has been detected or flagged, this line will not be merged with the crosswalk features, such as feature 508 or feature 510, so that the autonomous vehicle can accurately determine the correct location of the crosswalk. In this way, the crosswalk features (e.g., feature 508 and 510) are processed separately from the stop line feature.

In some embodiments, the detection of the stop line can determine the major axis 514 of crosswalks 508, 510 since the stop line will be parallel to the major axis 514.

Figure 6:
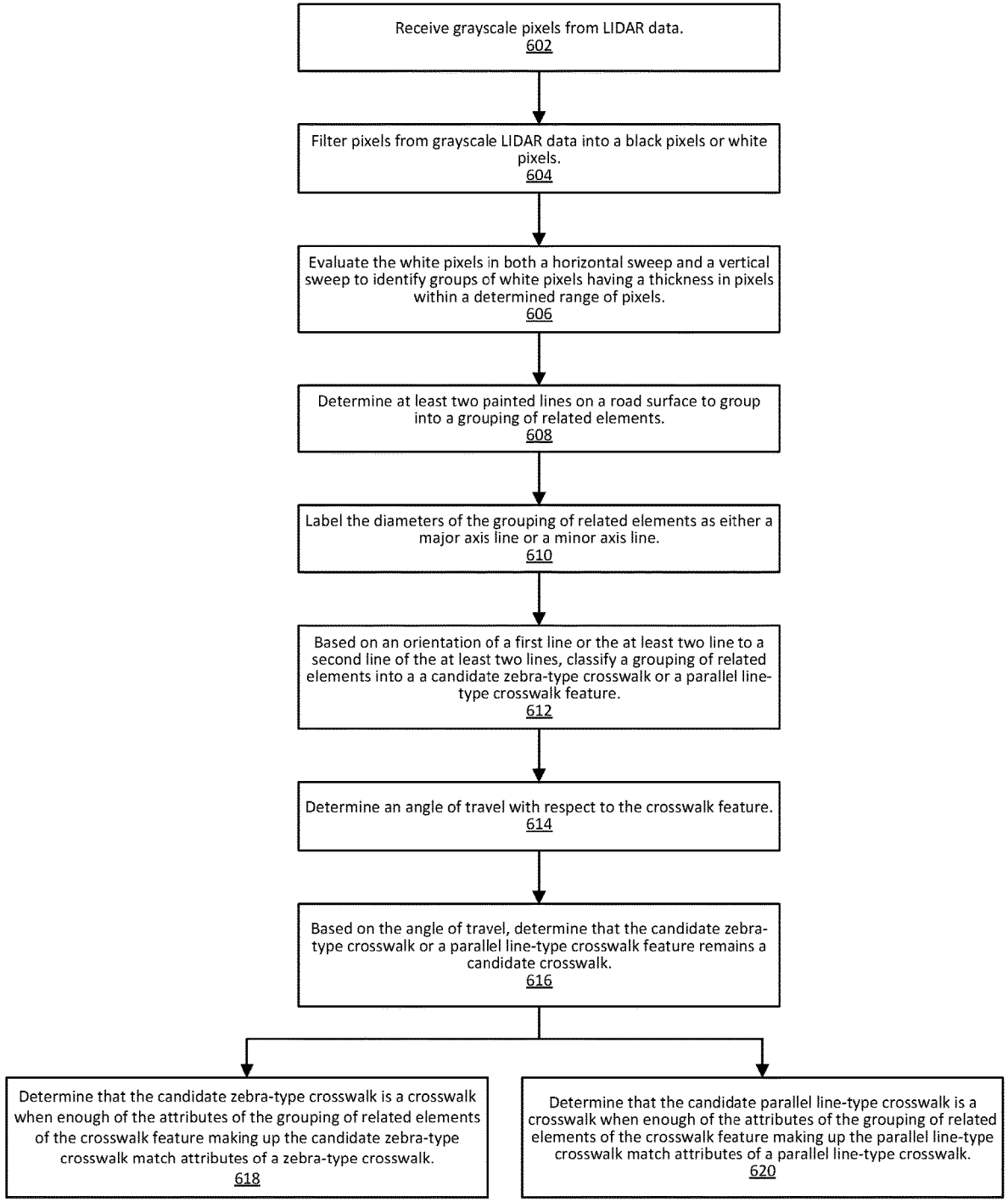
FIG. 6 shows an example method for detecting crosswalks in accordance with some aspects of the present technology.

FIG. 6 shows an example method for detecting crosswalks in accordance with some aspects of the present technology. The methodology can begin by receiving (602) greyscale pixels from LIDAR data. The pixels can be filtered (604) from greyscale LIDAR data into black pixels or white pixels, such that the data is binarized into information that indicates either a painted portion of the road (white pixels) or an unpainted portion (black pixels). The white pixels can be evaluated (606) in both a horizontal sweep and a vertical sweep to identify any groups of white pixels having a thickness or size in pixels within a determined range of pixels. For example, the determined range of pixels can be larger than dashed lane lines, but smaller than stop lines or solid lane lines.

Based on the above, at least two painted lines can be determined (608) to be on the road surface. Based on the orientation of a first line or at least two lines to a second line of the determined lines, the lines can be grouped into features (e.g., each feature a grouping of related lines/elements) that may indicate a crosswalk. The lines, for example, can be grouped into a rectangular feature. Each diameter of the rectangular feature can then be labelled (610) as either a major axis (longest diameter) or a minor axis (smallest diameter). In some embodiments, the major axis and the minor axis are orthogonal to each other, and can be determined from a statistical variation that represents how each feature is shaped, which can approximate a rectangular shape with a smallest diameter (minor axis) and a largest diameter (major axis). The feature can then be classified (612) into a type of candidate crosswalk (e.g., potential zebra-type or a parallel line-type crosswalk). In some embodiments, stop line features are flagged and removed from being grouped into the features.

An angle of travel with respect to the crosswalk feature can be determined (614). If the orientation of the major axis of the crosswalk feature is parallel to the direction of the road or travel of the AV, then the feature is a bike lane and can be ignored or discarded. If the orientation of the major axis is perpendicular to the direction of the road or travel, then the feature is a crosswalk. Based on the angle of travel being perpendicular to the major axis of the crosswalk feature, then, the crosswalk feature can be classified (616) into a candidate zebra-type or a parallel line-type crosswalk.

The candidate zebra-type crosswalk can be determined/confirmed (618) to be a crosswalk when enough of the attributes of the grouping of related elements within the crosswalk feature making up the candidate zebra-type crosswalk match attributes of a zebra-type crosswalk. The candidate parallel line-type crosswalk can be determined/confirmed (620) to be a crosswalk when enough of the attributes of the grouping of related elements within the crosswalk feature making up the candidate parallel line-type crosswalk match attributes of a zebra-type crosswalk.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 7:
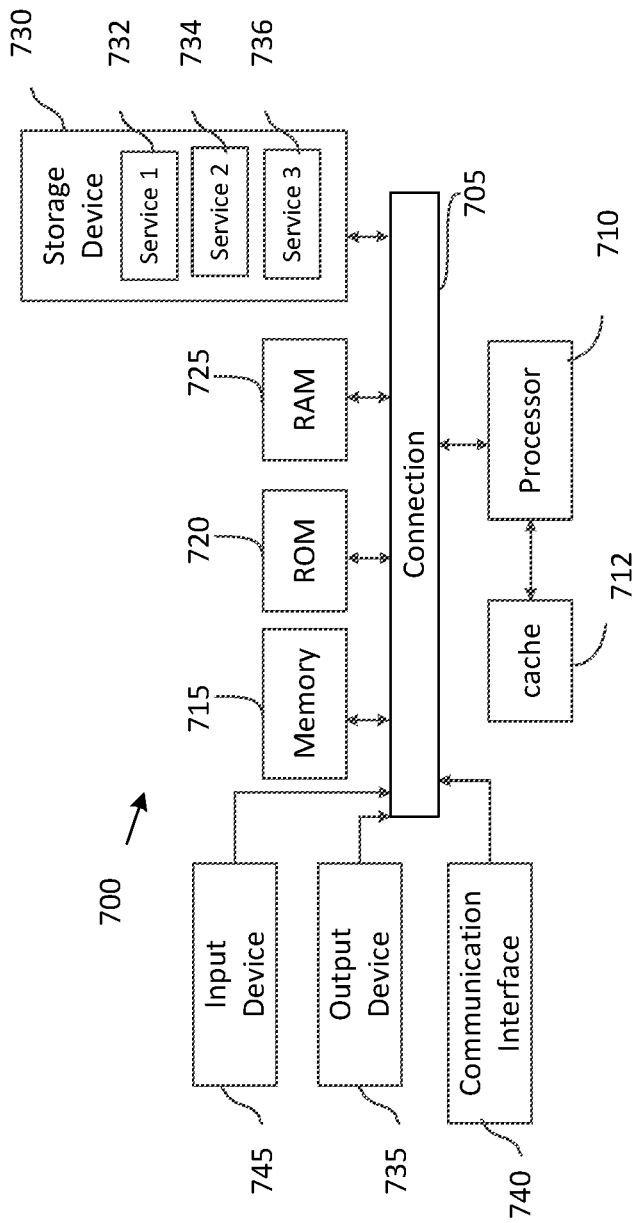
FIG. 7 shows an example of a system for implementing certain aspects of the present technology.

FIG. 7 shows an example of computing system 700, which can be for example any computing device making up internal computing system 110, remote computing system 150, (potential) passenger device executing rideshare app 170, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for crosswalk detection comprising:
   determining, from sensor data acquired from one or more sensors of an autonomous vehicle (AV), one or more clusters of the sensor data representative of a plurality of features of an environment along a navigated route;
   processing the one or more clusters of the sensor data to identify at least one feature of the plurality of features in the environment, wherein the at least one feature is identified based on a spatial closeness of the one or more clusters;
   generating by grouping the one or more clusters of the sensor data to form at least two painted lines on a road surface identified from the plurality of features;
   combining the at least two painted lines on the road surface into a grouping of related elements associated with the one or more clusters of the sensor data, the at least two painted lines comprising a minor axis and a major axis;
   identifying the grouping of related elements as a candidate zebra-type crosswalk or a parallel line-type crosswalk when the spatial closeness of the one or more clusters meets a predefined threshold;
   classifying the candidate zebra-type crosswalk or the parallel line-type crosswalk as a zebra-type crosswalk or the parallel line-type crosswalk based on attributes of the grouping of related elements, the attributes of the grouping of related elements including a distance between the at least two painted lines, and an orientation of the grouping of related elements on the road surface with respect to an angle of travel of the autonomous vehicle;
   identifying an inconsistency of the classifying the zebra-type crosswalk or the parallel line-type crosswalk from a set of pre-mapped data associated with the navigated route;
   updating the pre-mapped data based on the classifying the zebra-type crosswalk or the parallel line-type crosswalk; and
   controlling the direction of the movement of the autonomous vehicle during navigation, based on the updating of the pre-mapped data.

2. The computer-implemented method of claim 1, wherein determining the at least two painted lines on the road surface further comprises:
   filtering pixels from grayscale LIDAR data into a black pixels or white pixels; and
   evaluating the white pixels in both a horizontal sweep and a vertical sweep to identify groups of white pixels having a thickness in the pixels within a determined range of pixels, wherein any groups of white pixels having the thickness in the pixels within the determined range of pixels is combined into a line, resulting in the at least two painted lines.

3. The computer-implemented method of claim 1, wherein combining the at least two painted lines on the road surface into the grouping of related elements further comprises:
   determining the major axis of the grouping of related elements, wherein the major axis includes the grouping of related elements being greater than a threshold number of pixels in length; and
   determining the minor axis of the grouping of related elements, wherein the minor axis includes the grouping of related elements being less than the threshold number of pixels in the length.

4. The computer-implemented method of claim 1, wherein the zebra-type crosswalk includes a closer distance between the grouping of related elements, than the parallel line-type crosswalk.

5. The computer-implemented method of claim 1, the method further comprising:
   prior to the classification of the grouping of related elements, determining the angle of the travel with respect to the grouping of related elements; and
   based on the angle of the travel, determining that the candidate zebra-type crosswalk or the parallel line-type crosswalk remains a candidate crosswalk.

6. The computer-implemented method of claim 1, wherein classifying the grouping of related elements based on the attributes of the grouping of related elements further comprises:
   determining that the candidate zebra-type crosswalk is the crosswalk when one or more of the attributes of the grouping of related elements making up the candidate zebra-type crosswalk match attributes of the zebra-type crosswalk.

7. The computer-implemented method of claim 1, wherein classifying the grouping of related elements based on the attributes of the grouping of related elements further comprises:
   determining that the candidate parallel line-type crosswalk is the crosswalk when one or more of the attributes of the grouping of related elements making up the parallel line-type crosswalk match attributes of the parallel line-type crosswalk.

8. A non-transitory computer readable medium comprising instructions stored thereon, the instructions when executed cause at least one processor to:
   determine, from sensor data acquired from one or more sensors of an autonomous vehicle (AV), one or more clusters of the sensor data representative of a plurality of features of an environment along a navigated route;
   process the one or more clusters of sensor data to identify at least one feature of the plurality of features in the environment, wherein the at least one feature is identified based on a spatial closeness of the one or more clusters;
   generate by grouping the one or more clusters of sensor data to form at least two painted lines on a road surface identified from the plurality of features;
   combine the at least two painted lines on the road surface into a grouping of related elements associated with the one or more clusters of sensor data, the at least two painted lines comprising a minor axis and a major axis;
   identify the grouping of related elements as a candidate zebra-type crosswalk or a parallel line-type crosswalk when the spatial closeness of the one or more clusters meets a predefined threshold;

classify the candidate zebra-type crosswalk or the parallel line-type crosswalk as a zebra-type crosswalk or the parallel line-type crosswalk based on attributes of the grouping of related elements, the attributes of the grouping of the related elements including a distance between the at least two painted lines, and an orientation of the grouping of related elements on the road surface with respect to an angle of travel of the autonomous vehicle, with respect to the angle of the travel of the autonomous vehicle;

identify an inconsistency of the classifying the zebra-type crosswalk or the parallel line-type crosswalk from a set of pre-mapped data associated with the navigated route;

update the pre-mapped data based on the classifying the zebra-type crosswalk or the parallel line-type crosswalk; and control the direction of the movement of the autonomous vehicle during navigation, based on the updating of the pre-mapped data.

9. The non-transitory computer readable medium of claim 8, wherein the instructions cause the at least one processor to determine the at least two painted lines on the road surface further comprises instructions when executed cause at least one processor to:

filter pixels from grayscale LIDAR data into a black pixels or white pixels; and evaluate the white pixels in both a horizontal sweep and a vertical sweep to identify groups of white pixels having a thickness in the pixels within a determined range of pixels, wherein any groups of white pixels having the thickness in the pixels within the determined range of pixels is combined into a line, resulting in the at least two painted lines.

10. The non-transitory computer readable medium of claim 8, wherein the instructions cause the at least one processor to combine the at least two painted lines on the road surface into the grouping of related elements further comprises instructions when executed cause at least one processor to:

determine the major axis of the grouping of related elements, wherein the major axis includes the grouping of related elements being greater than a threshold number of pixels in length; and determine the minor axis of the grouping of related elements, wherein the minor axis includes the grouping of related elements being less than the threshold number of the pixels in the length.

11. The non-transitory computer readable medium of claim 8, wherein the zebra-type crosswalk includes a closer distance between the grouping of related elements, than the parallel line-type crosswalk.

12. The non-transitory computer readable medium of claim 8, further comprising instructions when executed cause the at least one processor to:

prior to a classification of the grouping of related elements, determine the angle of the travel with respect to the grouping of related elements; and based on the angle of the travel determine that the candidate zebra-type crosswalk or the parallel line-type crosswalk remains a candidate crosswalk.

13. The non-transitory computer readable medium of claim 8, wherein the instructions that cause the at least one processor to classify the grouping of related elements based on the attributes of the grouping of related elements further comprises instructions when executed cause the at least one processor to:

determine that the candidate zebra-type crosswalk is the crosswalk when one or more of the attributes of the grouping of related elements making up the candidate zebra-type crosswalk match attributes of the zebra-type crosswalk.

14. The non-transitory computer readable medium of claim 8, wherein the instructions that cause the at least one processor to classify the grouping of related elements based on the attributes of the grouping of related elements further comprises instructions when executed cause the at least one processor to:

determine that the candidate parallel line-type crosswalk is the crosswalk when one or more of the attributes of the grouping of related elements making up the parallel line-type crosswalk match attributes of the parallel line-type crosswalk.

15. A computing system comprising:

at least one non-transitory computer readable medium comprising instructions stored thereon, wherein the instructions when executed cause the computing system to:

determine, from sensor data acquired from one or more sensors of an autonomous vehicle (AV), one or more clusters of the sensor data representative of a plurality of features of an environment along a navigated route;

process the one more clusters of sensor data to identify at least one feature of the plurality of features in the environment, wherein the at least one feature is identified based on a spatial closeness of the one or more clusters;

generate by grouping the one or more clusters of sensor data to form at least two painted lines on a road surface identified from the plurality of features;

combine the at least two painted lines on the road surface into a grouping of related elements associated with the one or more clusters of sensor data, the at least two painted lines comprising a minor axis and a major axis;

identify the grouping of related elements as a candidate zebra-type crosswalk or a parallel line-type crosswalk when the spatial closeness of the one or more clusters meets a predefined threshold;

classify the candidate zebra-type crosswalk or the parallel line-type crosswalk as a zebra-type crosswalk or the parallel line-type crosswalk based on attributes of the grouping of related elements, the attributes of the grouping of the related elements including a distance between the at least two painted lines, and an orientation of the grouping of related elements on the road surface with respect to an angle of travel of the autonomous vehicle;

identify an inconsistency of the classifying the zebra-type crosswalk or the parallel line-type crosswalk from a set of pre-mapped data associated with the navigated route;

update the pre-mapped data based on the classifying the zebra-type crosswalk or the parallel line-type crosswalk; and control the direction of the movement of the autonomous vehicle during navigation, based on the updating of the pre-mapped data.

16. The computing system of claim 15, wherein the instructions when executed cause the computing system to further:

filter pixels from grayscale LIDAR data into a black pixels or white pixels;

and evaluate the white pixels in both a horizontal sweep and a vertical sweep to identify groups of white pixels having a thickness in the pixels within a determined range of pixels, wherein any groups of white pixels having the thickness in the pixels within the determined range of pixels is combined into a line, resulting in the at least two painted lines.

17. The computing system of claim 15, wherein the instructions when executed cause the computing system to further:
   determine the major axis of the grouping of related elements, wherein the major axis includes the grouping of related elements being greater than a threshold number of pixels in length; and
   determine the minor axis of the grouping of related elements, wherein the minor axis includes the grouping of related elements being less than the threshold number of the pixels in the length.

18. The computing system of claim 15, wherein the zebra-type crosswalk includes a closer distance between the grouping of related elements, than the parallel line-type crosswalk.

19. The computing system of claim 15, wherein the instructions when executed cause the computing system to further:
   prior to a classification of the grouping of related elements, determine the angle of the travel with respect to the grouping of related elements; and
   based on the angle of the travel determine that the candidate zebra-type crosswalk or the parallel line-type crosswalk remains a candidate crosswalk.

20. The computing system of claim 15, wherein the instructions when executed cause the computing system to further:
   determine that the candidate zebra-type crosswalk is the crosswalk when one or more of the attributes of the grouping of related elements making up the candidate zebra-type crosswalk match attributes of the zebra-type crosswalk.

* * * * *